US011739696B2

(12) United States Patent
Labrecque et al.

(10) Patent No.: US 11,739,696 B2
(45) Date of Patent: Aug. 29, 2023

(54) SYSTEM AND METHOD FOR SYNTHESIZING ENGINE OUTPUT POWER

(71) Applicant: PRATT & WHITNEY CANADA CORP., Longueuil (CA)

(72) Inventors: Michel Labrecque, Sainte-Julie (CA); Kevin Nguyen, Montréal (CA); Ninad Joshi, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/548,786

(22) Filed: Dec. 13, 2021

(65) Prior Publication Data

US 2023/0184177 A1 Jun. 15, 2023

(51) Int. Cl.
*F02C 9/16* (2006.01)
*F02C 3/04* (2006.01)

(52) U.S. Cl.
CPC ............... *F02C 9/16* (2013.01); *F02C 3/04* (2013.01); *F05D 2220/30* (2013.01); *F05D 2240/35* (2013.01); *F05D 2270/053* (2013.01); *F05D 2270/303* (2013.01); *F05D 2270/3013* (2013.01)

(58) Field of Classification Search
CPC .......... F02C 9/16; F02C 3/04; F05D 2220/30; F05D 2240/35; F05D 2270/053; F05D 2270/3013; F05D 2270/303
See application file for complete search history.

(56) References Cited

U.S. PATENT DOCUMENTS

| | | | | |
|---|---|---|---|---|
| 4,242,864 | A * | 1/1981 | Cornett | F02K 1/17 60/236 |
| 7,404,287 | B2 * | 7/2008 | Utamura | F02C 9/48 60/39.53 |
| 8,175,786 | B2 | 5/2012 | Nemet et al. | |
| 9,273,614 | B2 | 3/2016 | Martis et al. | |
| 2007/0113631 | A1 * | 5/2007 | Deuker | F23N 5/003 73/112.03 |
| 2009/0055105 | A1 | 2/2009 | Yoshida et al. | |
| 2009/0138170 | A1 * | 5/2009 | Nemet | F02C 3/305 701/100 |
| 2009/0281737 | A1 * | 11/2009 | Stadler | F01D 17/08 702/34 |
| 2011/0160979 | A1 * | 6/2011 | Muller | F01K 13/02 701/100 |
| 2018/0348065 | A1 * | 12/2018 | Lamarre | G01K 3/10 |

* cited by examiner

*Primary Examiner* — Jesse S Bogue
(74) *Attorney, Agent, or Firm* — Norton Rose Fulbright Canada LLP (57) ABSTRACT

A method and a system for synthesizing output power provided by an engine are provided. The engine comprising a compressor section, a combustor, and a turbine section in serial fluid flow communication. The engine is operated and, during the operating of the engine, a pressure of fluid at an exit of the compressor section, a temperature upstream of the exit of the compressor section, and a fuel flow rate to the engine are determined. A synthesized value of output power provided by the engine is determined based on a product of at least a first factor, a second factor, and a third factor, the first factor being a function of the pressure, the second factor being a function of the temperature, and the third factor being a function of the fuel flow rate. The synthesized value of output power provided by the engine is output.

18 Claims, 8 Drawing Sheets

SYSTEM AND METHOD FOR SYNTHESIZING ENGINE OUTPUT POWER

TECHNICAL FIELD

The application relates generally to engines, and, more particularly, to synthesizing output power provided by an engine.

BACKGROUND OF THE ART

The amount of output power provided by a engine generally varies based upon the performance and environmental demands placed on the engine as the engine operates under different conditions. It is therefore desirable to be able to generate an approximate value of the engine output power in order to aid in the understanding of current engine operating conditions and provide predictability for performance demand requirements. While existing techniques for estimating engine output power are suitable for their purposes, improvements are desired.

SUMMARY

In one aspect, there is provided a method for synthesizing output power provided by an engine, the engine comprising a compressor section, a combustor, and a turbine section in serial fluid flow communication. The method comprises operating the engine, determining, during the operating of the engine, a pressure of fluid at an exit of the compressor section, a temperature upstream of the exit of the compressor section, and a fuel flow rate to the engine, determining a synthesized value of output power provided by the engine based on a product of at least a first factor, a second factor, and a third factor, the first factor being a function of the pressure, the second factor being a function of the temperature, and the third factor being a function of the fuel flow rate, and outputting the synthesized value of output power provided by the engine.

In some embodiments, the method further comprises determining the first factor as a first mathematical function of the pressure and a first constant, determining the second factor as a second mathematical function of the temperature and a second constant, and determining the third factor as a third mathematical function of the fuel flow rate and a third constant.

In some embodiments, the determining the synthesized value of output power provided by the engine comprises computing the product of the first factor, the second factor, the third factor, and a fourth constant.

In some embodiments, values of the first constant, the second constant, the third constant, and the fourth constant are determined for bringing a difference between the synthesized value of output power provided by the engine and an actual output power provided by the engine within a predetermined threshold, with the synthesized value of output power provided by the engine being lower than the actual output power provided by the engine.

In some embodiments, each of the first function, the second function, and the third function is one of an exponential function, a quadratic function, and a logarithmic function.

In some embodiments, the method further comprises dividing the pressure by a reference pressure to obtain a normalized pressure and dividing the temperature by a reference temperature to obtain a normalized temperature, the first factor determined as the first function of the normalized pressure and the first constant, and the second factor determined as the second function of the normalized temperature and the second constant.

In some embodiments, the compressor section comprises at least one low compressor stage positioned upstream of at least one high pressure compressor stage, and the determining the pressure of fluid at the exit of the compressor section comprises obtaining at least one pressure measurement from at least one pressure sensor located at an outlet of the at least one high pressure compressor stage.

In some embodiments, the determining the pressure of fluid at the exit of the compressor section comprises obtaining at least one pressure measurement from at least one pressure sensor located at an inlet of the combustor.

In some embodiments, the method further comprises determining the pressure of fluid at the exit of the compressor section from the fuel flow rate.

In some embodiments, the pressure of fluid at the exit of the compressor section is a first pressure, the method further comprising determining a second pressure of fluid at a location upstream of the exit of the compressor section and computing a ratio of the first pressure to the second pressure, the first factor determined as the first function of the ratio and the first constant.

In some embodiments, the compressor section comprises at least one low pressure compressor stage positioned upstream of at least one high pressure compressor stage, and the determining the second pressure comprises obtaining at least one pressure measurement from at least one pressure sensor located at an inlet of the at least one high pressure compressor stage.

In some embodiments, the determining the second pressure comprises obtaining at least one pressure measurement from at least one pressure sensor located at an inlet of the engine.

In another aspect, there is provided a system for synthesizing output power provided by an engine, the engine comprising a compressor section, a combustor, and a turbine section in serial fluid flow communication. The system comprises a processing unit and a non-transitory computer-readable medium having stored thereon instructions executable by the processing unit for operating the engine, determining, during the operating of the engine, a pressure of fluid at an exit of the compressor section, a temperature upstream of the exit of the compressor section, and a fuel flow rate to the engine, determining a synthesized value of output power provided by the engine based on cavity product of at least a first factor, a second factor, and a third factor, the first factor being a function of the pressure, the second factor being a function of the temperature, and the third factor being a function of the fuel flow rate, and outputting the synthesized value of output power provided by the engine.

In some embodiments, the instructions are executable by the processing unit for determining the first factor as a first mathematical function of the pressure and a first constant, determining the second factor as a second mathematical function of the temperature and a second constant, and determining the third factor as a third mathematical function of the fuel flow rate and a third constant.

In some embodiments, the instructions are executable by the processing unit for determining the synthesized value of output power provided by the engine comprising computing the product of the first factor, the second factor, the third factor, and a fourth constant.

In some embodiments, the instructions are executable by the processing unit for determining values of the first constant, the second constant, the third constant, and the fourth constant for bringing a difference between the synthesized value of output power provided by the engine and an actual output power provided by the engine within a predetermined threshold, with the synthesized value of output power provided by the engine being lower than the actual output power provided by the engine.

In some embodiments, each of the first function, the second function, and the third function is one of an exponential function, a quadratic function, and a logarithmic function.

In some embodiments, the instructions are executable by the processing unit for dividing the pressure by a reference pressure to obtain a normalized pressure and dividing the temperature by a reference temperature to obtain a normalized temperature, the first factor determined as the first function of the normalized pressure and the first constant, and the second factor determined as the second function of the normalized temperature and the second constant.

In some embodiments, the compressor section comprises at least one low compressor stage positioned upstream of at least one high pressure compressor stage, the instructions are executable by the processing unit for determining the pressure of fluid at the exit of the compressor section comprising obtaining at least one pressure measurement from at least one pressure sensor located at one of an outlet of the at least one high pressure compressor stage and an inlet of the combustor.

In some embodiments, the pressure of fluid at the exit of the compressor section is a first pressure, the instructions executable by the processing unit for determining a second pressure of fluid at a location upstream of the exit of the compressor section and computing a ratio of the first pressure to the second pressure, the first factor determined as the first function of the ratio and the first constant.

DESCRIPTION OF THE DRAWINGS

Reference is now made to the accompanying figures in which.

It will be noticed that throughout the appended drawings, like features are identified by like reference numerals.

DETAILED DESCRIPTION

Figure 1:
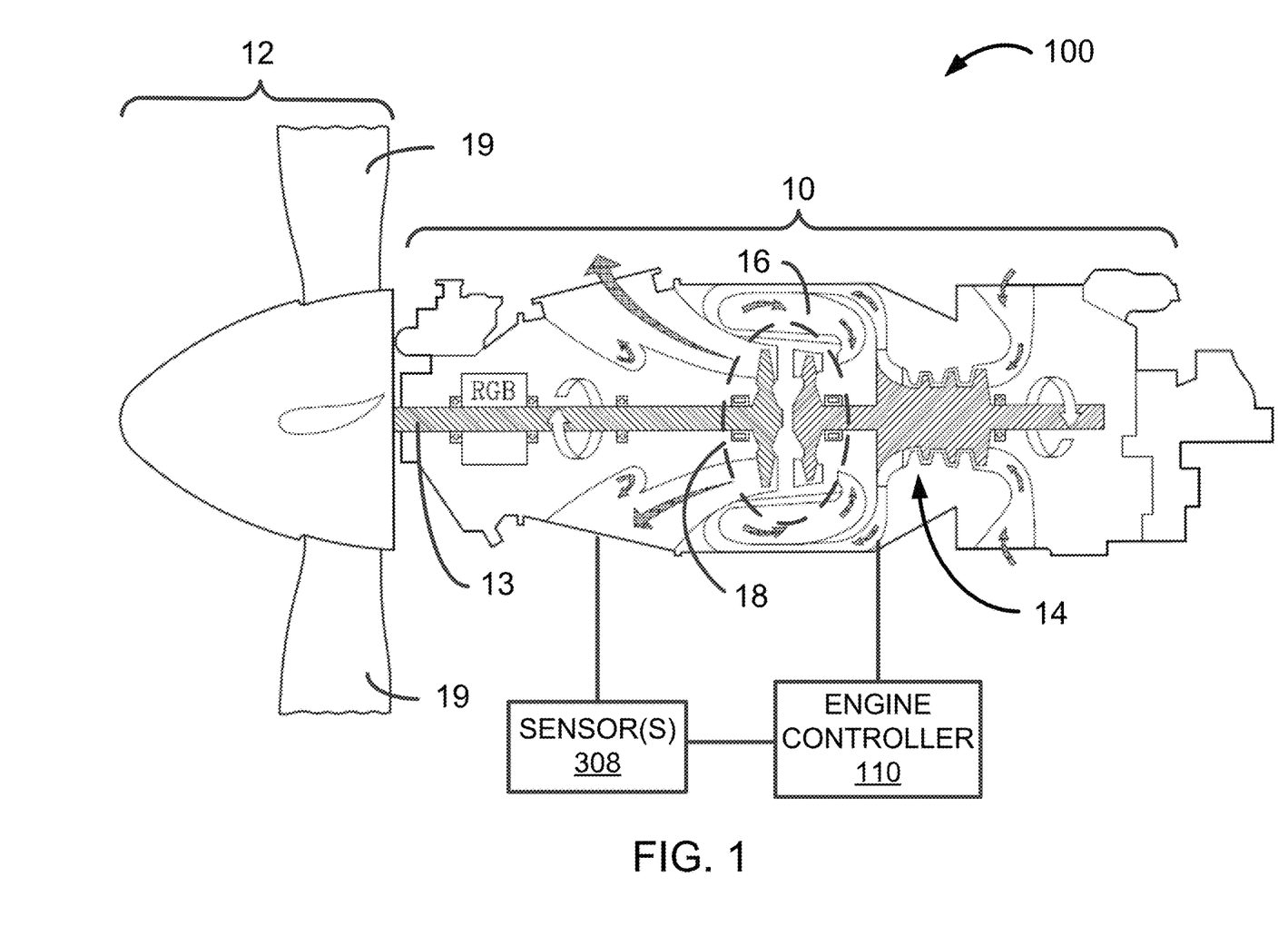
FIG. 1 is a schematic cross sectional view of a powerplant comprising a gas turbine engine, in accordance with an illustrative embodiment.

FIG. 1 illustrates an example powerplant 100 for an aircraft of a type provided for use in subsonic flight, to which the systems and methods described herein may be applied. The powerplant 100 generally comprises an engine 10 and a propeller 12. In the illustrated embodiment, the engine 10 is a turboprop engine. The powerplant 100 generally comprises, in serial flow communication, the propeller 12 attached to a shaft 13 and through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The propeller 12 converts rotary motion from the shaft 13 to provide propulsive force, for example for the aircraft. The propeller 12 comprises two or more propeller blades 19. A blade angle of the blades 19 may be adjusted. The blade angle may be referred to as a beta angle, an angle of attack or a blade pitch. The powerplant 100 may be implemented to comprise a single or multi-spool gas turbine engine, where the turbine section 18 is connected to the propeller 12 through a reduction gearbox (RGB, reference 17 in FIG. 2).

The RGB 17 may be rear-mounted, i.e. integrated into the engine 10 at the turbine end (as illustrated in FIG. 1), or front-mounted, i.e. integrated into the engine 10 at the compressor end (not shown). Furthermore, the propeller 12 and RGB 17 may be integrated into the engine 10 in a tractor configuration, in which the propeller 12 is mounted in front of the engine 10 (as illustrated in FIG. 1), or a pusher configuration (not shown), in which the propeller 12 is mounted behind the engine 10 and the force provided by the propeller 12 is pushing towards the engine 10.

Although illustrated as a turboprop engine, the gas turbine engine 10 may alternatively be another type of engine, for example a turboshaft engine. In addition, although the engine 10 is described herein for flight applications, it should be understood that other uses, such as industrial or the like, may apply.

Control of the operation of the engine 10 can be effected by one or more control systems, for example an engine controller 110, which is communicatively coupled to the engine 10. The engine controller 110 can adjust a fuel flow provided to the engine 10, the position and orientation of variable geometry mechanisms within the engine 10, a bleed level of the engine 10, and the like, based on predetermined schedules or algorithms. In some embodiments, the engine controller 110 may be implemented as part of one or more full-authority digital engine controls (FADECs) or other similar device(s), including electronic engine controller(s) (EEC(s)), engine control unit(s) (ECU(s)), electronic propeller control(s), propeller control unit(s), or the like, that are programmed to control the operation of the engine 10. The operation of the engine 10 can be controlled by way of one or more actuators, mechanical linkages, hydraulic systems, and the like. The engine controller 110 can be coupled to the actuators, mechanical linkages, hydraulic systems, and the like, in any suitable fashion for effecting control of the engine 10.

Figure 2:
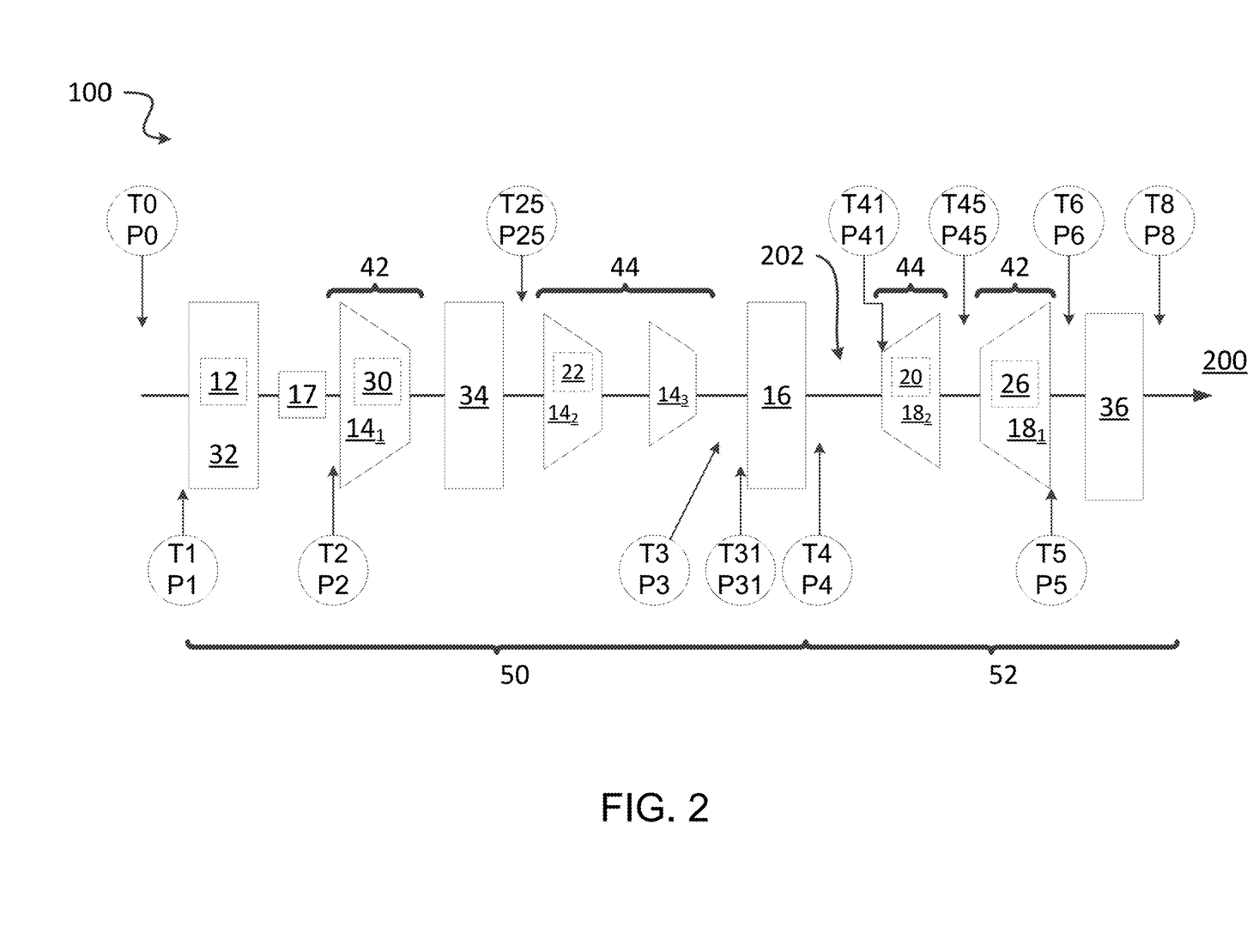
FIG. 2 is a schematic diagram illustrating locations of the engine of FIG. 1 identified using station numbering, in accordance with an illustrative embodiment.

With additional reference to FIG. 2, the powerplant 100 is illustrated schematically as having multiple elements forming a gas path along which gas flows from the inlet 32 of the engine 10 to the exhaust 36 of the engine 10. The engine 10 illustrated in FIG. 2 includes two spools, namely a low-pressure spool 42, and a high-pressure spool 44. The low-pressure spool 42 includes a low-pressure compressor stage $14_1$, which includes low-pressure (LP) compressor rotor(s) 30, and a low-pressure turbine $18_1$, which includes LP turbine rotors(s) 26. It should however be understood that the engine 10 may include more than two spools (e.g., three spools). In other embodiments of the engine 10, the low-pressure spool 42 can include more than one compressor stage. In the illustrated embodiment, the high-pressure spool 44 includes two high-pressure compressor stages $14_2$ and $14_3$ which include high-pressure (HP) compressor rotor(s) 22, and a high-pressure turbine $18_2$, which includes HP turbine rotor(s) 20. In other embodiments of the engine 10, the high-pressure spool 44 can include only one compressor stage, or more than two (e.g., three) compressor stages. In the illustrated embodiment, an inter-compressor case (ICC) 34 is disposed between the low-pressure compressor stage $14_1$ and the high-pressure compressor stage $14_2$.

In one embodiment, specific locations of the engine 10 may be identified using station numbering. While station numbering is described herein with reference to the engine schematic diagram illustrated in FIG. 2, this is for example purposes only. The station numbering may be applied to other types of engines than the engine of FIG. 2, and station numbering of one or more standards or industry conventions may apply. Free stream conditions are identified as station number 0, where free stream refers to the air upstream of the engine 10. Engine intake front flange or leading edge is identified as station number 1. A first (e.g., LP) compressor entry is identified as station number 2. An intermediate (e.g., HP) compressor entry is identified as station number 25. A last (e.g., HP) compressor exit (referred to herein as an exit of the compressor section 14 or "compressor exit") is identified as station number 3. A combustor entry (or inlet) is identified as station number 31. A combustor exit is identified as station number 4. The last turbine exit is identified as station number 5. The flow conditions upstream of a mixer occur at station number 6. Station number 7 is at an entry of an exhaust nozzle or thrust reverser, station number 8 is at a nozzle throat and station number 9 is downstream of the nozzle throat or at an exhaust nozzle exit. The station numbers 0, 1, 2, 3, 4, 5, 6, 7, 8 and 9 may be referred to as fundamental station numbers. Station numbers between the fundamental station numbers may be referred to as intermediate station numbers. Intermediate station numbers may be denoted using a second digit suffixed to a fundamental station number, such as 12, 13, 15, 16, 21, 24, 25, 28, 31, 41, 43, 44, 45, 46, 49, and the like. It should be understood that intermediate station numbers may also be denoted using decimal numbers, such as 4.5.

As working fluids, for instance a gas mixture, pass through the engine 10, the working fluids undergo numerous pressure and temperature changes. Temperature and/or pressure measurements (e.g., working fluid temperature and/or working fluid pressure measurements) may be obtained for specific locations of the engine 10. The temperature and/or pressure measurements may be identified based on station numbering. As illustrated in FIG. 2, temperature (e.g., total or static temperature) measured at a specific location of the engine 10 may be denoted using a station number suffixed to the letter T. Similarly, pressure (e.g., total or static pressure) measured at a specific location of the engine 10 may be denoted using a station number suffixed to the letter P. Example temperature and pressure measurement locations, T0 to T8 and P0 to P8, for the flow of the gas mixture along the gas path 200 are illustrated in FIG. 2.

T0, taken upstream of the inlet 32, refers to free stream temperature, i.e. an ambient temperature of the environment surrounding the engine 10 and P0 refers to free stream pressure, i.e. an ambient pressure. Although illustrated as being captured upstream of the inlet 32, it should be understood that the ambient temperature T0 and the ambient pressure P0 can be captured at any suitable location in the environment in which the engine 10 is operating.

T1 refers to an inlet temperature, taken at the inlet 32 of the engine 10, just as the ambient air enters through the engine 10, and P1 refers to an inlet pressure.

T2 refers to a low-pressure compressor inlet temperature, taken before the LP compressor rotor(s) 30 of the low-pressure compressor stage $14_1$, and P2 refers to a low-pressure compressor inlet pressure. T25 refers to a high-pressure compressor temperature, taken between the ICC 34 and the high-pressure compressor stage $14_2$ (i.e. taken at the inlet of the high pressure compressor stage $14_2$), and P25 refers to a high-pressure compressor entry pressure.

T3 refers to a high-pressure compressor delivery (or discharge) temperature, taken after (i.e. at an outlet of) the high-pressure compressor stages $14_2$ and $14_3$, and P3 refers to a high-pressure compressor delivery pressure. T3 and P3 may be taken at the last compressor exit, for instance after the HP compressor rotor(s) 22 for a high-pressure spool 44 including a single compressor stage. T31 refers to a combustor intake temperature and P31 refers to a combustor intake pressure. Measurements for T31 (or P31) can serve as a proxy for T3 (or P3) because the last compressor exit (where T3 or P3 is taken) and the entry to the combustor 16 (where T31 or P31 is taken) are in close proximity.

T4 refers to a combustor outlet temperature, taken before the HP turbine rotor(s) 20, and after the combustor 16, and P4 refers to a combustor outlet pressure. T41 refers to a temperature taken at or near an entry to the high-pressure turbine $18_2$, and P41 refers to pressure at the same location. Measurements for T41 (or P41) can serve as a proxy for T4 (or P4) because the exit of the combustor (where T4 or P4 is taken) and the entry to the high-pressure turbine $18_2$ (where T41 or P41 is taken) are in close proximity. T45 refers to a temperature taken between the high-pressure turbine $18_2$ and the low-pressure turbine $18_1$, and P45 corresponds to the pressure taken at the same location.

Located at an intermediate point between the combustor 16 and the high-pressure turbine $18_2$ is a vane 19. The vane 19 directs the gas mixture passing through the engine 10 toward the high-pressure turbine $18_2$. The geometry of the vane 19 defines a vane throat, which is referred to hereinafter as a high-pressure turbine (HPT) vane throat 202. The HPT vane throat 202 is a narrowing at the exit of the combustor 16 formed by the vane 19. For the purposes of the present disclosure, temperature values, pressure values, or other values which are said to be evaluated at the exit of the compressor section 14 may be evaluated at an outlet of the high-pressure compressor stages $14_2$ and $14_3$ (i.e. at station number 3), at an inlet of the combustor 16 (i.e. at station number 31), or at any other suitable location. Also, temperature values, pressure values, or other values which are said to be evaluated upstream of the exit of the compressor section 14 may be evaluated at an inlet of the engine 10 (i.e. at station number 1), at an inlet of a first high-pressure compressor stage $14_2$ (i.e. at station number 25), or at any other suitable location upstream of the exit of the compressor section 14.

T5 refers to the turbine outlet temperature and P5 refers to the turbine outlet pressure, taken after the LP turbine rotor(s) 26 of the low-pressure turbine $18_1$. T6 refers to an exhaust gas temperature and P6 refers to an exhaust gas pressure, taken between the low-pressure turbine $18_1$ and the exhaust 36. T8 refers to an exhaust gas temperature and P8 refers to an exhaust gas pressure, taken at the outlet of the exhaust 36.

It should be noted that the above description of FIG. 2 pertains to an embodiment of the engine 10 which includes multiple spools, namely the low- and high-pressure spools 42, 44. The present disclosure may be applied to other types of engines, including engines with only one spool, or with more than two spools, as appropriate. Additionally, it should be understood that the foregoing disclosure relating to pressures and temperatures measurable within the engine 10 is not exhaustive, and various physical and/or virtual sensors may be deployed within the engine 10 to assess other pressure and/or temperature values for other locations within the engine 10.

Figure 3:
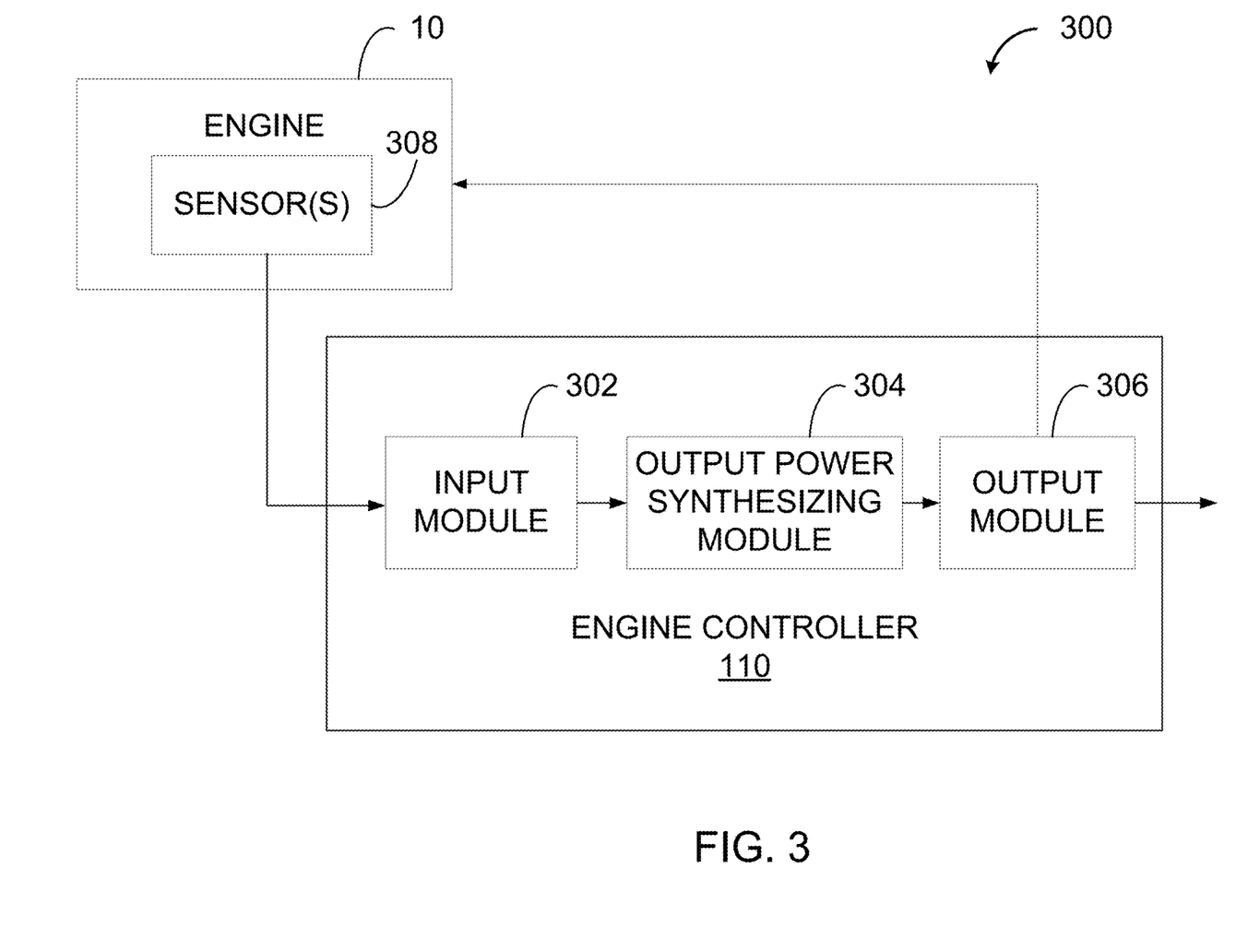
FIG. 3 is a block diagram illustrating a system for synthesizing output power for the engine of FIG. 1, in accordance with an illustrative embodiment.

Referring now to FIG. 3 in addition to FIG. 1, an example system 300 for synthesizing output power, i.e. for generating an approximate or synthesized value of (referred to herein as "synthesizing) the output power, provided by a turboprop or a turboshaft engine, such as the engine 10, will now be described. The engine 10 is configured to produce power output in the form of shaft horse power (SHP). The systems and methods described herein may therefore be used to synthesize SHP for a turboprop or a turboshaft engine, such as engine 10. In one embodiment, the systems and methods described herein may be used as an alternative to existing techniques to synthesize output power provided by a turboprop or a turboshaft engine, such as techniques based on direct measurement of torque and low-pressure spool speed.

The engine controller 110, which can be electrically and/or mechanically coupled to the engine 10 in any suitable fashion, is configured to monitor the operating parameters of the engine 10 and to control at least part of the operation of the engine 10. As will be described further below, the controller 110 is configured to synthesize the output power (i.e. SHP) provided by the engine 10 based on the monitored engine parameter(s), and more specifically based on pressure at an exit of the compressor section 14 (referred to herein as "compressor exit pressure"), on temperature upstream of the exit of the compressor section 14, and on fuel flow rate to the engine 10. The synthesized value of the output power (also referred to herein as the "synthesized output power") may aid in the understanding of current operating conditions of the engine 10, as well as enable prediction of a current performance state of the engine 10. The synthesized value of the output power may, in some embodiments, be used by the controller 110 to control operation of the engine 10.

The controller 110 illustratively comprises an input module 302, an output power synthesizing module 304 communicatively coupled to the input module 302, and an output module 306 communicatively coupled to the output power synthesizing module 304. One or more sensors 308 are provided on the engine 10 and configured to measure one or more parameters of the engine 10. In some embodiments, the sensor(s) 308 are pre-existing sensors of the engine 10. The sensor(s) 308 may comprise one or more of a temperature sensor, pressure sensor, altimeter, fuel flow sensor (or meter) and/or any other suitable sensor. The engine parameter(s) may include, but are not limited to, temperature of the engine 10, pressure of the engine 10, ambient air temperature, ambient air pressure, altitude, and fuel flow rate (Wf) to the engine 10. The engine parameter(s) may be measured continuously or at predetermined time intervals, and the measurements may be recorded in memory or any suitable storage (not shown) accessible by the controller 110. In some embodiments, the controller 110 may be configured to trigger an action to cause the sensor(s) 308 to acquire the engine parameter measurements.

In other embodiments, the values of the engine parameter(s) may be provided by an engine computer (e.g., the controller 110) or an aircraft computer (not shown), which may be configured to synthesize one or more of the engine parameter(s). In some embodiments, the value of a first engine parameter (e.g., pressure) may be obtained directly from the sensor(s) 308 and the value of a second engine parameter (e.g., temperature) may be provided by the engine computer or the aircraft computer, or vice versa. Other embodiments may apply. The engine computer or the aircraft computer may be configured to calculate one or more engine parameters from an arithmetic function of one or more engine parameters. For example, the one or more engine parameters may be the summation, delta, product, quotient, exponent or other arithmetic function of multiple engine parameters.

It is proposed herein to synthesize the output power of the engine 10 as a function of compressor exit pressure, temperature measured upstream of the exit of the compressor section 14, and fuel flow rate to the engine 10, as measured using sensor(s) 308 (e.g., for pressure and temperature) and/or synthesized (e.g., for fuel flow rate). In this manner, equipment (e.g., sensor(s) 308) provided in a cold section (reference 50 in FIG. 2) of the engine 10 may be used to synthesize output power, thus alleviating the need for equipment or instrumentation provided in a hot section (reference 52 in FIG. 2) of the engine 10. By using equipment provided in the cold section of the engine 10, the overall life of the engine components may be increased.

In one embodiment, the synthesized value of the output power is generated by the output power synthesizing module 304 based on the high-pressure compressor delivery pressure (P3), i.e. on pressure measurement(s) acquired by sensor(s) 308 located at engine station number 3. It should however be understood that, in other embodiments, the synthesized value of the output power may be generated based on the combustor intake pressure (P31) taken at engine station number 31 since the combustor intake pressure can serve as a proxy for the high-pressure compressor delivery pressure, as previously noted.

In some embodiments, the output power synthesizing module 304 may alternatively be configured to synthesize the output power of the engine 10 as a function of a pressure ratio computed based on the compressor exit pressure. In one embodiment, the pressure ratio across one or more compressor stages of the engine 10 may be used. For example, the output power synthesizing module 304 may be configured to compute a ratio of the compressor exit pressure (e.g., P3 or P31) to the high-pressure compressor pressure (P25). In other words, the ratio P3/P25 or P31/P25 is computed and used to synthesize engine output power. In another embodiment, the output power synthesizing module 304 may be configured to compute a ratio of the compressor exit pressure (e.g., P3 or P31) to the engine inlet pressure (P1). In other words, the ratio P3/P1 or P31/P1 is computed and used to synthesize engine output power.

In addition, because engine output power is influenced by the temperature of the working fluids, for instance the gas mixture. passing through the engine 10 in addition to fuel flow rate, the output power synthesizing module 304 is also configured to synthesize the output power of the engine 10 as a function of temperature (e.g., measured using the sensor(s) 308) upstream of the exit of the compressor section 14. More specifically and as will be discussed further below, the output power synthesizing module 304 is configured to synthesize output power as a function of pressure weighted by temperature, by computing a product of pressure and temperature values. In one embodiment, the temperature used by the output power synthesizing module 304 to synthesize the output power is the engine's inlet temperature (T1), i.e. obtained from temperature measurement(s)

acquired by the sensor(s) 308 located at engine station number 1. In other embodiments, the output power may be synthesized based on the high-pressure compressor temperature (T25) taken at engine station number 25. The temperature measurement used to synthesize output power may therefore be acquired at an intermediate compressor stage. It should be understood that other embodiments may apply and the temperature measurement may be acquired at any other suitable location upstream of the exit of the compressor section 14. For instance, in some embodiments, the output power may be synthesized based on the low-pressure compressor inlet temperature (T2) taken at engine station 2, i.e. taken before the LP turbine rotor(s) 26 of the low-pressure compressor stage $14_1$. In some embodiments, the output power may also be synthesized based on the free stream temperature (T0) taken upstream of the inlet 32. For example, the product of P3 and T1 (or similarly the product of P31 and T1), the product of P3 and T25 (or similarly the product of P31 and T25), the product of P3 and T2 (or similarly the product of P31 and T2) or the product of P3 and T0 (or similarly the product of P31 and T0) may be used to generate the synthesized value of the engine's output power. In addition, pressure ratios computed based on compressor exit pressure (e.g., P3/P25, P31/P25, P3/P1, P31/P1, P3/P2, P31/P2, P3/P0, or P31/P0) may also be weighted by temperatures (e.g., T1, T25, T2 or T0) to provide the synthesized output power.

Still referring to FIG. 3, the input module 302 is configured to receive the engine parameters (e.g., pressure, temperature, fuel flow rate) measured by the sensor(s) 308 and/or synthesized, during operation of the engine 10. In some embodiments, the input module 302 may be configured to pre-process (e.g., filter to remove noise, using any suitable filtering means such as a digital filter or the like) the signal(s) containing the engine parameter measurements received from the sensor(s) 308. The signal(s), which are optionally pre-processed, are then transmitted to the output power synthesizing module 304 which uses the engine parameter measurements to synthesize output power for the engine 10. While reference is made herein to the output power synthesizing module 304 using measurements from the sensor(s) 308 to synthesize output power provided by the engine 10, it should be understood that the output power synthesizing module 304 may synthesize output power based, at least in part, on synthesized engine parameters, as described herein above.

As will be discussed further below, the output power synthesizing module 304 is configured to compute the synthesized value of the engine's output power as a function of the product of at least a first factor, a second factor, and a third factor, the first factor being a function of the compressor exit pressure, the second factor being a function of the temperature upstream of the compressor exit (e.g., the engine inlet temperature), and the third factor being a function of the fuel flow rate. In one embodiment, the synthesized value of the engine's output power is computed, as follows:

$$\text{Synthesized output power} = k * f_1(P,a) * f_2(W_f,b) * f_3(T,c) \quad (1)$$

where Synthesized output power is the synthesized value of the output power (e.g., SHP) provided by the engine 10, P is the compressor exit pressure, $W_f$ is the fuel flow rate to the engine 10, T is the temperature upstream of the compressor exit (e.g., the engine inlet temperature), k, a, b, and c are constants whose values are selected to produce a synthesized value of the output power that is within a desired threshold (or tolerance) of the actual (or true) output power of the engine 10, and $f_1$ is a first mathematical relationship between (or a first mathematical function of) P and a, $f_2$ is a second mathematical relationship between (or a second mathematical function of) $W_f$ and b, and $f_3$ is a third mathematical relationship between (or a third mathematical function of) T and c. In some embodiments, the same mathematical functions (e.g., exponential relationship) may apply for $f_1$, $f_2$, and $f_3$. In equation (1), the first factor is $f_1(P, a)$, the second factor is $f_2(W_p, b)$, and the third factor is $f_3(T, c)$.

The values of k, a, b, and c may vary depending on the configuration and on operating conditions of the engine 10 including, but not limited to, flight conditions, altitude, airspeed, installation losses, and flight regime (e.g., takeoff, cruise, climb, descent, landing, etc.). The values of k, a, b, and c may be determined and refined through development testing performed on ground and/or in flight. In one embodiment, the engine 10 is operated under a test environment (e.g., in a production test cell provided at a testing facility) to obtain the values of the constants (k, a, b, and c) used to synthesize output power. It should however be understood that simulation and/or modeling of the engine 10 may also be used (e.g., through the controller 110) during a testing phase of the engine 10 to obtain the values of the constants k, a, b, and c. Once determined, the values of k, a, b, and c may be stored (in any suitable format such as a map, matrix, or lookup-table) in memory or other suitable storage accessible by the controller 110.

The values of k, a, b, and c are selected to ensure that the synthesized output power is below the actual output power delivered by the engine 10. In one embodiment, the values of k, a, b, and c are selected to bring a difference between the synthesized output power and the actual output power within a predetermined threshold (or tolerance). For example, the output power synthesizing module 304 may be configured to provide a synthesized value of the engine's output power that is below the actual output power provided the engine 10 by a desired tolerance (e.g., 10% or the like), the tolerance depending on operating conditions on the engine 10. In this manner, in operation, the engine 10 may deliver more output power than the synthesized output power, which translates in the aircraft's actual performance being better than expected. In one embodiment, the value of k ranges between 0.01 and 3.0, the value of a ranges between 0.1 and 1.5, the value of b ranges between 0.5 and 1.5, and the value of c ranges between 0.1 and 1.5. Other embodiments may apply.

Any suitable mathematical function $f_1$, $f_2$, $f_3$ may apply, depending on the configuration and on operating conditions of the engine 10. The mathematical functions $f_1$, $f_2$, $f_3$ may be selected to improve the accuracy of the synthesized value of output power provided by the engine 10. In one embodiment, an exponential relationship (or function) may be used for each mathematical function $f_1, f_2, f_3$. For example, an exponential relationship (i.e. an exponentiation operation) $P^a$ $$\left(\text{or } \frac{P}{P_{ref}}^a\right)$$

between the pressure P (or the non-dimensionalized pressure $$\frac{P}{P_{ref}},$$

as discussed below with reference to equation (2)) and the constant a may apply. Similarly, an exponential relationship $W_f^b$ between the fuel flow rate $W_f$ and the constant b, and an exponential relationship $T^c$ $$(or \frac{T}{T_{ref}}^c)$$

between the temperature T (or the non-dimensionalized temperature $$\frac{T}{T_{ref}})$$

and the constant c may apply. With the output power being synthesized as a function of pressure measured at station 3 (i.e. P3) and the temperature being measured at station 1 (i.e. T1), equation (1) therefore becomes in this example:

$$\text{Synthesized output power} = k * P_3^a * W_f^b * T_1^c \qquad (2)$$

It should however be understood that any other suitable mathematical function other than the exponential function, including, but not limited to, a quadratic function and a logarithmic function, may apply.

In some embodiments, the output power synthesizing module 304 may be configured to correct (i.e. non-dimensionalize or normalize) the engine parameters in order to take into account ambient conditions. In other words, although equation (1) above makes use of the raw pressure and temperature values (e.g., as obtained from the sensor(s) 308 or synthesized in any suitable manner), output power may be synthesized using non-dimensionalized (or referred) pressure and temperature values. For this purpose, the output power synthesizing module 304 may be configured to divide the compressor exit pressure by a reference pressure to obtain a non-dimensionalized (or "referred") pressure, and to divide the temperature upstream of the compressor exit (e.g., the engine inlet temperature) by a reference temperature to obtain a non-dimensionalized (or "referred") temperature. In one embodiment, the reference pressure is 14.696 psi (pounds per square inch) and the reference temperature is 518.67° R on the Rankine scale, at standard sea level. Other embodiments may apply.

With the output power being synthesized as a function of the non-dimensionalized pressure and the non-dimensionalized temperature, equation (1) therefore becomes:

$$\text{Synthesized output power} = k * f_1\left(\frac{P}{P_{ref}}, a\right) * f_2(W_f, b) * f_3\left(\frac{T}{T_{ref}}, c\right) \qquad (3)$$

where $P_{ref}$ is the reference pressure, $$\frac{P}{P_{ref}}$$

is the non-dimensionalized compressor exit pressure, $T_{ref}$ is the reference temperature, and $$\frac{T}{T_{ref}}$$

is the non-dimensionalized temperature upstream of the compressor exit.

While equations (1), (2), and (3) above are described with reference to the compressor exit pressure, it should be understood that equations (1), (2), and (3) may also be used when pressure ratios are derived from the compressor exit pressure, as described above. In this case, a mathematical relationship is established between the first value (or numerator) of the pressure ratio and a first constant a (as described above) and between the first value (or denominator) of the pressure ratio and a second constant, referred to herein as a'. Similar to constants k, a, b, and c, the value of constant a' may vary depending on the configuration and on operating conditions of the engine 10. The value of a' may be determined and refined through development testing and stored in memory or other suitable storage accessible by the controller 110. The value of a' is selected to ensure that the synthesized output power is below the actual output power delivered by the engine 10, within a predetermined threshold. In one embodiment, the value of a' ranges between 0.1 and 3.0. Other embodiments may apply. Equations (1) and (3) above then become:

$$\text{Synthesized output power} = k * f_1(P_{ratio}, a, a') * f_2(W_f, b) * f_3(T, c) \qquad (4)$$

And:

$$\text{Synthesized output power} = k * f_1\left(\frac{P_{ratio}}{P_{ref}}, a, a'\right) * f_2(W_f, b) * f_3\left(\frac{T}{T_{ref}}, c\right) \qquad (5)$$

where $P_{ratio}$ is the pressure ratio derived from the compressor exit pressure. For example, $P_{ratio}$ may be P3/P1, P31/P1, P3/P25, or P31/P25.

For example, for a pressure ratio of the compressor exit pressure measured at station 3 (i.e. P3) to the pressure measured at station 1 (i.e. P1), with the temperature being measured at station 1 (i.e. T1), the synthesized output power may be obtained as follows:

$$\text{Synthesized output power} = k * \frac{P_3^a}{P_1^{a'}} * W_f^b * T_1^c \qquad (6)$$

Or as follows, when the output power is additionally synthesized as a function of the non-dimensionalized pressure and the non-dimensionalized temperature:

$$\text{Synthesized output power} = k * \left(\frac{P_3}{P_{ref}}\right)^a \frac{1}{P_1^{a'}} * W_f^b * \left(\frac{T_1}{T_{ref}}\right)^c \qquad (7)$$

As another example, for a pressure ratio of the compressor exit pressure measured at station 3 (i.e. P3) to the pressure measured at station 25 (i.e. P25), the synthesized output power may be obtained as follows:

$$\text{Synthesized output power} = k * \frac{P_3^a}{P_{25}^{a'}} * W_f^b * T_1^c \qquad (8)$$

Or as follows, when the output power is additionally synthesized as a function of the non-dimensionalized pressure and the non-dimensionalized temperature:

$$\text{Synthesized output power} = k * \left(\frac{P_3}{P_{ref}}\right)^a \frac{1}{P_{25}^{a'}} * W_f^b * \left(\frac{T_1}{T_{ref}}\right)^c \quad (9)$$

In still other embodiments, the ratio of fuel flow rate to compressor exit pressure (referred to herein as a "Ratio Unit" or RU, where RU=$W_f$/P, where P is the compressor exit pressure) may be used to synthesize output power. In this case, the compressor exit pressure (e.g., P3 or P31) may be derived from the fuel flow rate and ratio unit, such that P may be replaced by $W_f$/RU in the equation for computing the synthesized output power. For example, equation (6) may become:

$$\text{Synthesized output power} = k * \frac{\left(W_f/RU\right)^a}{P_1^{a'}} * W_f^b * T_1^c \quad (10)$$

The output power synthesizing module 302 may then provide the synthesized output power to the output module 306. In some embodiments, the output module 306 may be configured to output the synthesized output power to a suitable output device (e.g., a cockpit display or the like). In other embodiments, the output module 306 may be configured to generate, based on the synthesized output power, one or more control signals for use in controlling the operation of the engine 10. The output module 306 may then output the control signal(s) to the engine 10 (e.g., to the actuators, mechanical linkages, hydraulic systems, and the like coupled to the engine controller 110), using any suitable means, for effecting control of the engine 10 based on the synthesized output power.

Figure 4:
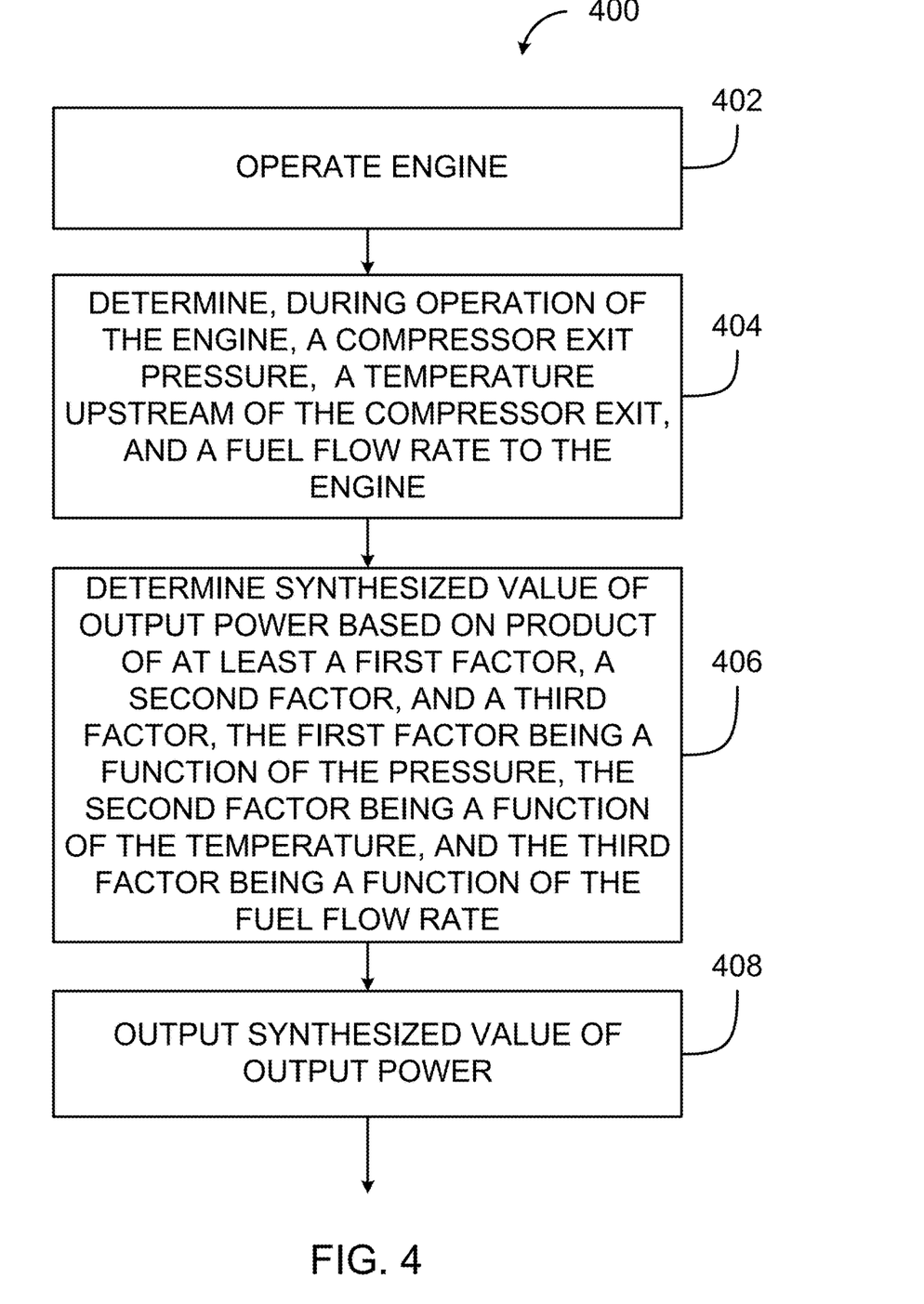
FIG. 4 is a flowchart illustrating a method for synthesizing output power for the engine of FIG. 1, in accordance with an illustrative embodiment.

Referring now to FIG. 4, a flowchart illustrating an example method 400 for synthesizing output power for a turboprop or turboshaft engine, such as the engine 10 of FIG. 1, will now be described. At step 402, the engine is operated. At step 404, a compressor exit pressure of the engine, a temperature upstream of the compressor exit, and a fuel flow rate to the engine are determined during operation of the engine. As described above with reference to FIGS. 1 to 3, in one embodiment, the compressor exit pressure may be determined based on at least one pressure measurement obtained from at least one pressure sensor located at an outlet of at least one high compressor stage of the engine. In another embodiment, the compressor exit pressure may be determined based on at least one pressure measurement obtained from at least one pressure sensor located at an inlet of the combustor.

At step 406, a synthesized value of output power provided by the engine is determined (as per equations (1) to (10) above) based on a product of at least a first factor, a second factor, and a third factor, the first factor being a function of the compressor exit pressure, the second factor being a function of the temperature upstream of the compressor exit, and the third factor being a function of the fuel flow rate. In some embodiments, the output power may be synthesized based on a ratio of the compressor exit pressure to a pressure at an inlet of the at least one high compressor stage. In other embodiments, the output power may be synthesized based on a ratio of the compressor exit pressure to a pressure at an intake (or inlet) of the engine. In some embodiments, the compressor exit pressure is derived based on a fuel flow rate to the engine (determined during operation of the engine) and then used to synthesize output power. In some embodiments, the pressure is divided by a reference pressure in order to obtain a referred (also referred to as a normalized or non-dimensionalized) pressure (used to determine the first factor), and the temperature is divided by a reference temperature in order to obtain a referred (also referred to as a normalized or non-dimensionalized) temperature (used to determine the second factor). The synthesized output power may then be output at step 408.

Figure 5A:
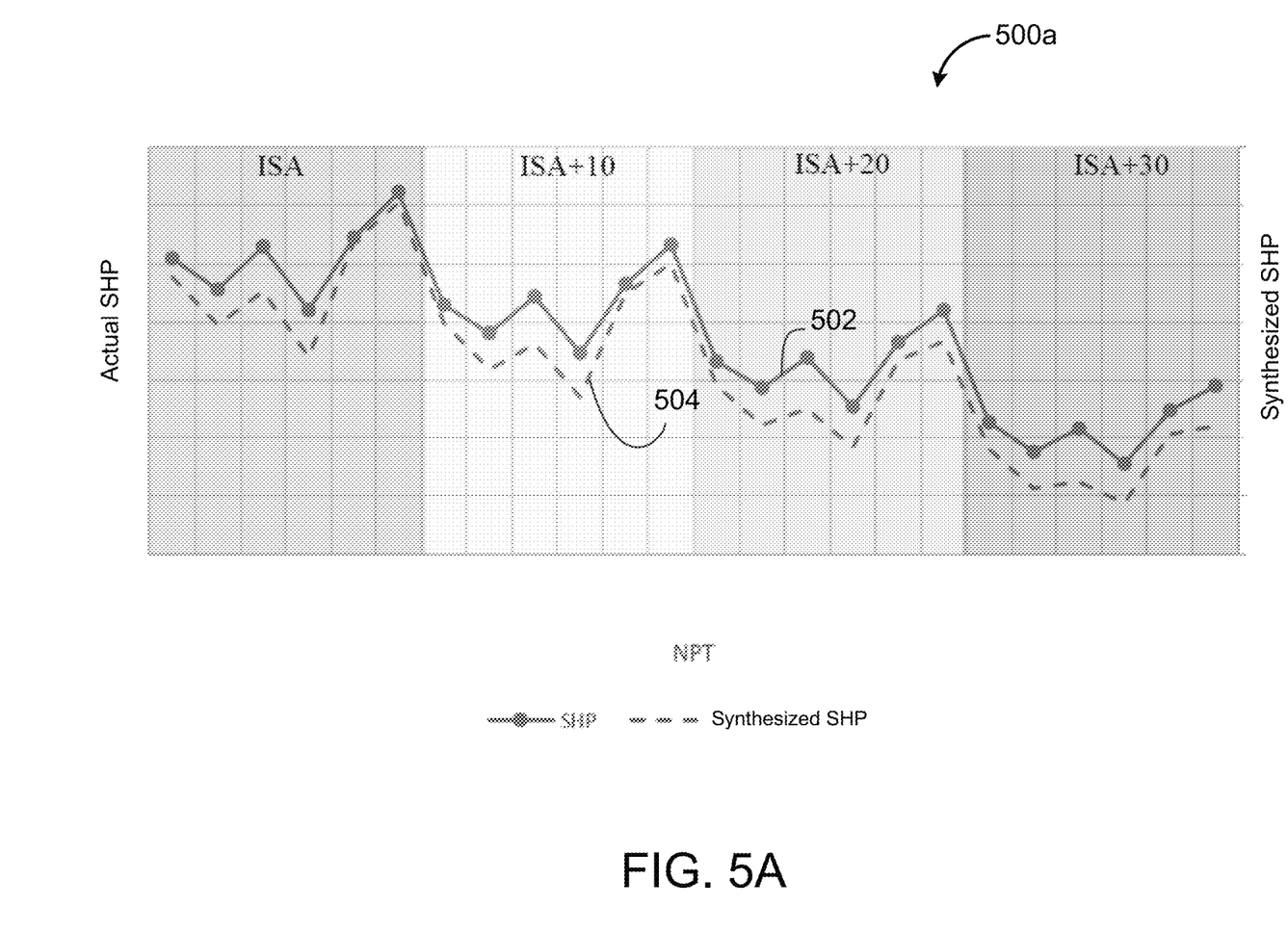
FIGS. 5A, 5B, and 5C are graphs illustrating an actual output power and a synthesized output power for the engine of FIG. 1, in accordance with an illustrative embodiment.
Figure 5B:
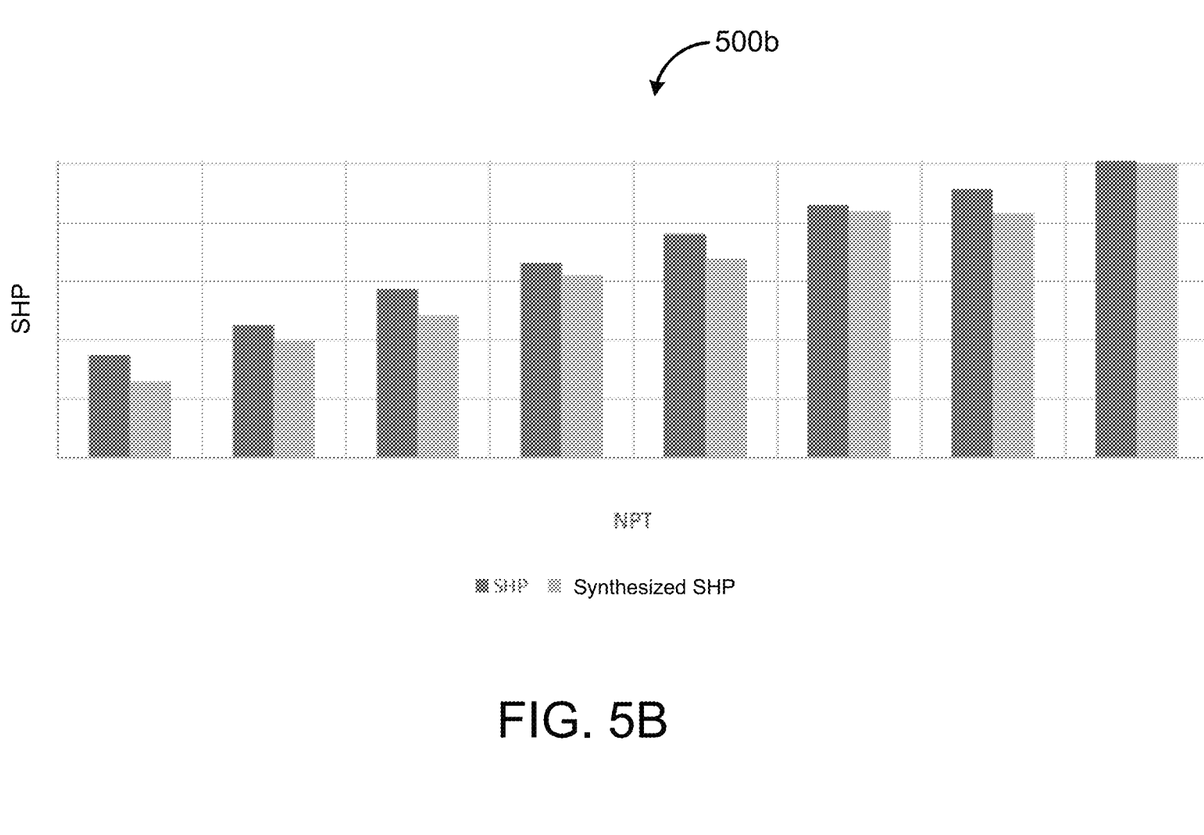
Figure 5C:
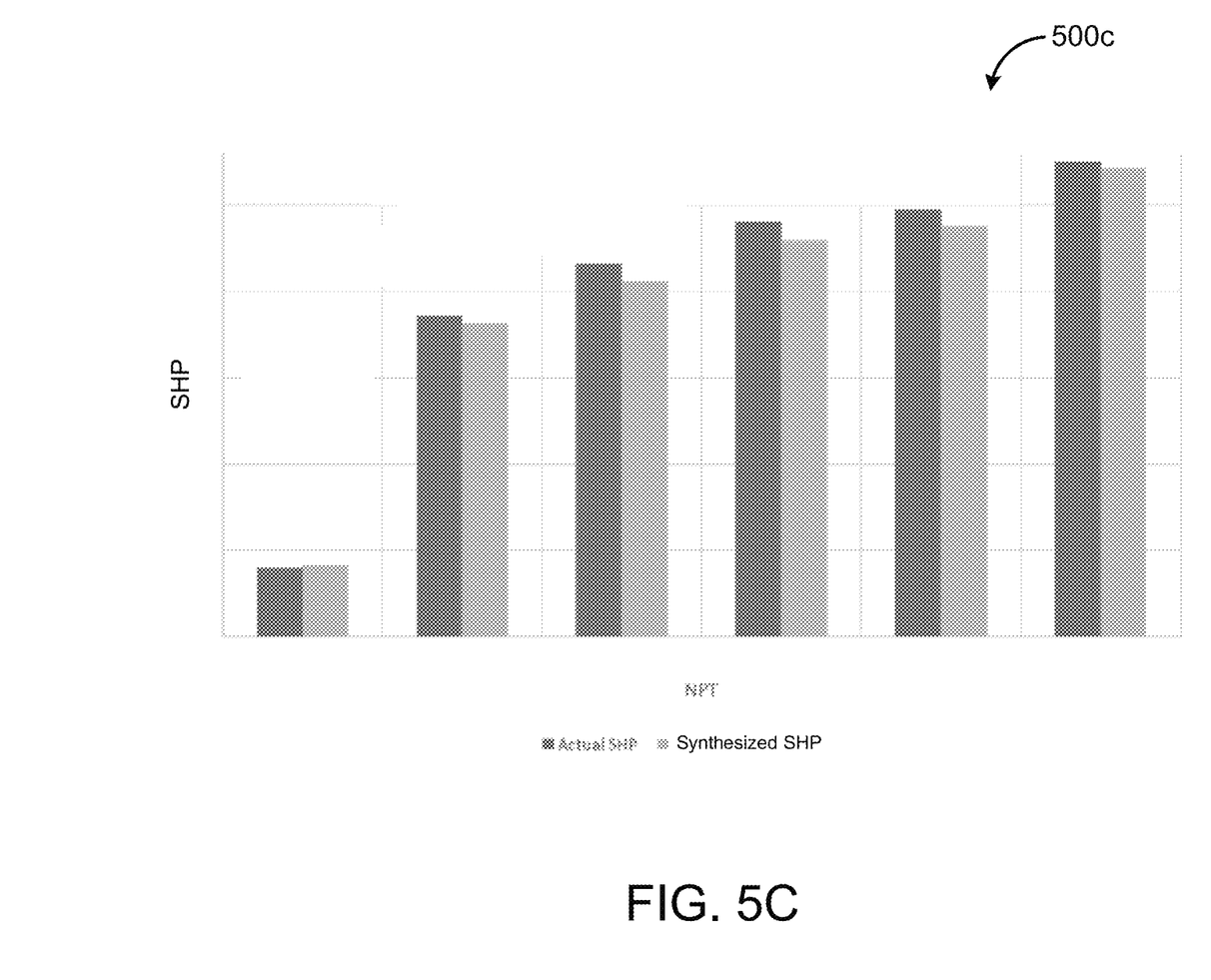

Referring now to FIG. 5A, a graph 500a plots in solid line a curve 502 of the true (or actual) output power (i.e. SHP) of an engine, such as the engine 10, versus power turbine speed (NPT), taken at constant altitude conditions. A curve 504 (illustrated in dashed lines) is indicative of the synthesized output power provided by the engine versus NPT, at constant altitude, the synthesized output power obtained using the systems and methods described herein. FIG. 5B shows as a bar chart 500b the synthesized output power provided by the engine compared to the actual output power delivered by the engine, for varying temperature conditions (i.e., internal standard atmosphere (ISA) or above ISA), at constant altitude and speed conditions. FIG. 5C shows as a bar chart 500c the synthesized output power compared to the actual output power delivered by the engine, at varying altitude, temperature, and speed conditions. It can be seen from FIGS. 5A, 5B, and 5C that the synthesized output power (e.g., curve 504 in FIG. 5A) is equal to or below the true (or actual) output power (e.g., curve 502 in FIG. 5A), which is indicative of the ability of the system and methods described herein to accurately synthesize engine output power. It should be understood that the systems and methods described herein may also be configured to synthesize output power for ground conditions.

In some embodiments, the systems and methods described herein may be used as a backup to an existing torque and speed-based power measurement system provided in a turboprop or turboshaft engine. In other embodiments, the systems and methods described herein may replace a torque sensing system of the engine, such as torque tubes and torque shafts. This may, in turn, reduce the overall engine size and weight, leading to a decrease in costs.

Figure 6:
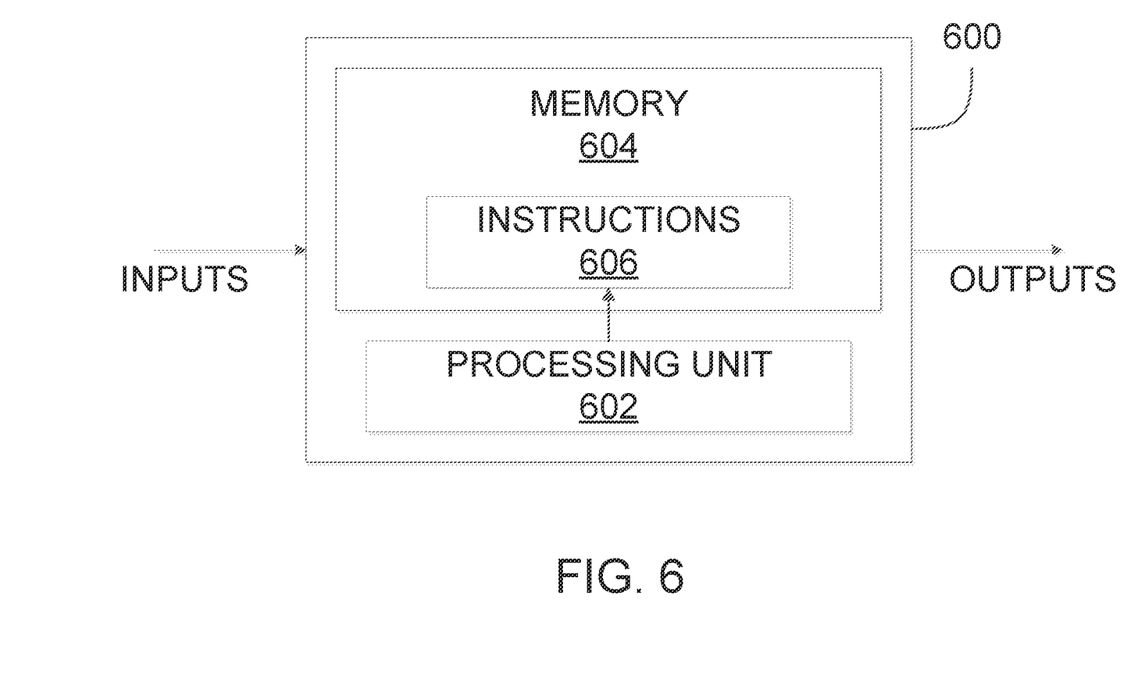
FIG. 6 is a block diagram of an example computing device, in accordance with an illustrative embodiment.

With reference to FIG. 6, an example of a computing device 600 is illustrated. For simplicity only one computing device 600 is shown but more computing devices 600 operable to exchange data may be provided. The computing devices 600 may be the same or different types of devices. The controller (reference 110 of FIG. 3) and/or the method (reference 400 of FIG. 1) may be implemented with one or more computing devices 600. Other embodiments may also apply.

The computing device 600 comprises a processing unit 602 and a memory 604 which has stored therein computer-executable instructions 606. The processing unit 602 may comprise any suitable devices configured to implement the method 400 such that instructions 606, when executed by the computing device 600 or other programmable apparatus, may cause the functions/acts/steps performed as part of the method 400 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems described herein may be implemented in a high level procedural or object oriented programming or scripting language, or a combination thereof, to communicate with or assist in the operation of a computer system, for example the computing device 600. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and pre-defined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for synthesizing output power provided by an engine, the engine comprising a compressor section, a combustor, and a turbine section in serial fluid flow communication, the method comprising:
   operating the engine;
   determining, during the operating of the engine, a pressure of fluid at an exit of the compressor section, a temperature upstream of the exit of the compressor section, and a fuel flow rate to the engine;
   determining a synthesized value of output power provided by the engine based on a product of at least a first factor determined as a first mathematical function of the pressure and a first constant, a second factor determined as a second mathematical function of the temperature and a second constant, and a third factor determined as a third mathematical function of the fuel flow rate and a third constant; and
   outputting the synthesized value of output power provided by the engine.

2. The method of claim 1, wherein the determining the synthesized value of output power provided by the engine comprises computing the product of the first factor, the second factor, the third factor, and a fourth constant.

3. The method of claim 2, wherein values of the first constant, the second constant, the third constant, and the fourth constant are determined for bringing a difference between the synthesized value of output power provided by the engine and an actual output power provided by the engine within a predetermined threshold, with the synthesized value of output power provided by the engine being lower than the actual output power provided by the engine.

4. The method of claim 1, wherein each of the first mathematical function, the second mathematical function, and the third mathematical function is one of an exponential function, a quadratic function, and a logarithmic function.

5. The method of claim 1, further comprising dividing the pressure by a reference pressure to obtain a normalized pressure and dividing the temperature by a reference temperature to obtain a normalized temperature, the first factor determined as the first mathematical function of the normalized pressure and the first constant, and the second factor determined as the second mathematical function of the normalized temperature and the second constant.

6. The method of claim 1, wherein the compressor section comprises at least one low compressor stage positioned upstream of at least one high pressure compressor stage, further wherein the determining the pressure of fluid at the exit of the compressor section comprises obtaining at least one pressure measurement from at least one pressure sensor located at an outlet of the at least one high pressure compressor stage.

7. The method of claim 1, wherein the determining the pressure of fluid at the exit of the compressor section comprises obtaining at least one pressure measurement from at least one pressure sensor located at an inlet of the combustor.

8. The method of claim 1, further comprising determining the pressure of fluid at the exit of the compressor section from the fuel flow rate.

9. The method of claim 1, wherein the pressure of fluid at the exit of the compressor section is a first pressure, the method further comprising determining a second pressure of fluid at a location upstream of the exit of the compressor section and computing a ratio of the first pressure to the second pressure, the first factor determined as the first mathematical function of the ratio and the first constant.

10. The method of claim 9, wherein the compressor section comprises at least one low pressure compressor stage positioned upstream of at least one high pressure compressor stage, further wherein the determining the second pressure comprises obtaining at least one pressure measurement from at least one pressure sensor located at an inlet of the at least one high pressure compressor stage.

11. The method of claim 9, wherein the determining the second pressure comprises obtaining at least one pressure measurement from at least one pressure sensor located at an inlet of the engine.

12. A system for synthesizing output power provided by an engine, the engine comprising a compressor section, a combustor, and a turbine section in serial fluid flow communication, the system comprising:
a processing unit; and
a non-transitory computer-readable medium having stored thereon instructions executable by the processing unit for:
operating the engine;
determining, during the operating of the engine, a pressure of fluid at an exit of the compressor section, a temperature upstream of the exit of the compressor section, and a fuel flow rate to the engine;
determining a synthesized value of output power provided by the engine based on a product of at least a first factor determined as a first mathematical function of the pressure and a first constant, a second factor determined as a second mathematical function of the temperature and a second constant, and a third factor determined as a third mathematical function of the fuel flow rate and a third constant; and
outputting the synthesized value of output power provided by the engine.

13. The system of claim 12, wherein the instructions are executable by the processing unit for determining the synthesized value of output power provided by the engine comprising computing the product of the first factor, the second factor, the third factor, and a fourth constant.

14. The system of claim 13, wherein the instructions are executable by the processing unit for determining values of the first constant, the second constant, the third constant, and the fourth constant for bringing a difference between the synthesized value of output power provided by the engine and an actual output power provided by the engine within a predetermined threshold, with the synthesized value of output power provided by the engine being lower than the actual output power provided by the engine.

15. The system of claim 12, wherein each of the first mathematical function, the second mathematical function, and the third mathematical function is one of an exponential function, a quadratic function, and a logarithmic function.

16. The system of claim 12, wherein the instructions are executable by the processing unit for dividing the pressure by a reference pressure to obtain a normalized pressure and dividing the temperature by a reference temperature to obtain a normalized temperature, the first factor determined as the first mathematical function of the normalized pressure and the first constant, and the second factor determined as the second mathematical function of the normalized temperature and the second constant.

17. The system of claim 12, wherein the compressor section comprises at least one low compressor stage positioned upstream of at least one high pressure compressor stage, further wherein the instructions are executable by the processing unit for determining the pressure of fluid at the exit of the compressor section comprising obtaining at least one pressure measurement from at least one pressure sensor located at one of an outlet of the at least one high pressure compressor stage and an inlet of the combustor.

18. The system of claim 12, wherein the pressure of fluid at the exit of the compressor section is a first pressure, the instructions executable by the processing unit for determining a second pressure of fluid at a location upstream of the exit of the compressor section and computing a ratio of the first pressure to the second pressure, the first factor determined as the first mathematical function of the ratio and the first constant.

* * * * *